United States Patent
Liu

(10) Patent No.: US 7,384,301 B2
(45) Date of Patent: Jun. 10, 2008

(54) ANTI-WEAR FLEXIBLE FLAT CABLE

(75) Inventor: Chin-Te Liu, Hsinchu (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 0 days.

(21) Appl. No.: 11/538,423

(22) Filed: Oct. 3, 2006

(65) Prior Publication Data

US 2008/0081509 A1    Apr. 3, 2008

(51) Int. Cl.
  *H01R 12/24*    (2006.01)
(52) U.S. Cl. .................. 439/492; 439/162
(58) Field of Classification Search ........... 439/162, 439/492
  See application file for complete search history.

(56) References Cited

U.S. PATENT DOCUMENTS 5,194,011 A * 3/1993 Yeakley et al. ............ 439/162
5,398,689 A * 3/1995 Connor et al. ............. 600/459
7,116,451 B2* 10/2006 Chang ...................... 358/497
2007/0002399 A1* 1/2007 Kato ........................ 358/486

* cited by examiner

*Primary Examiner*—Javaid Nasri
(74) *Attorney, Agent, or Firm*—WPAT, P.C.; Anthony King

(57) ABSTRACT

An anti-wear FFC (flexible flat cable) according to the present invention is made up of a plurality of covered wires parallel to each other in side-by-side relationship. The anti-wear FFC is folded and forms a plurality of planes lengthwise. The anti-wear FFC includes a base plane and a wing plane connected to the base plane. The base plane and the wing plane forms an angle therebetween. The stress of the wind plane connected to the base plane prevents the FFC from protruding upwards under elasticity and further moves following a signal collecting unit smoothly.

4 Claims, 3 Drawing Sheets

ANTI-WEAR FLEXIBLE FLAT CABLE

BACKGROUND OF THE INVENTION

1. Field of the Invention

The present invention relates to a flexible flat cable, and more particularly, to an anti-wear flexible flat cable.

2. The Related Art

FFC (flexible flat cable) is widely deployed in many applications, such as MFP (multi-function periphery) or scanner. Conventionally, the FFC makes electric connection between a signal collecting unit and a signal processing unit of a MFP or a scanner.

Please refer to FIG. 1. A conventional FFC 200 has a rectangular shape and is made up of a plurality of covered wires parallel to each other in side-by-side relationship.

Now refer to FIG. 2. A conventional MFP or scanner generally includes a signal processing unit 50 and a signal collecting unit 40 covered by a glass 300. The FFC 200 at one end connects to a signal collecting unit 40 and at another end connects to a signal processing unit 50 for transmitting electrical signal therebetween. The signal processing unit 50 is fixed in the electronic device (a MFP or a scanner) while the signal collecting unit 40 moves under the glass 300 back and forwards for collecting signal. Accordingly, the FFC 200 connected to the signal collecting unit 40 moves back and forwards following the signal colleting unit 40. For the signal collecting unit 40 is positioned upon the signal processing unit 50, the FFC 200 connected to the signal collecting unit 40 and signal processing unit 50 is bent. Further more, the bent FFC 200 will protrude upwards under elasticity.

Nowadays, the design of MFP or scanner is shifted towards a trend of minimization, further resulting in a decreased space between the FFC 200 and the glass 300. As a result, the bent FFC 200 between the signal collecting unit 40 and signal processing unit 50 protrudes upwards under elasticity and reaches the glass 300. When the FFC 200 follows the signal collecting unit 40, the friction between the protruding part of the FFC 200 and the glass 300 involves damage to the FFC 200 and glass 300, further resulting in shortening the performance life of the FFC 200 and glass 300.

SUMMARY OF THE INVENTION

Accordingly, an object of the present invention is to provide an anti-wear FFC to overcome the shortcoming mentioned above.

The anti-wear flexible flat cable which is made up of a plurality of covered wires parallel to each other in side-by-side relationship. The anti-wear flexible flat cable is folded and forms a plurality of planes lengthwise. The anti-wear flexible flat cable includes a base plane and a wing plane connected to the base plane. The base plane and the wing plane form an angle therebetween.

Alternatively, the covered wires mentioned above of the anti-wear FFC may be positioned only in the base plane of the anti-wear FFC.

The anti-wear FFC is installed in an electronic device. More particularly, the anti-wear FFC connects to a signal collecting unit at one end and to a signal processing unit at another end for transmitting electrical signal therebetween. The signal collecting unit and signal processing unit are covered by a glass. At working state, the anti-wear FFC is bent, meanwhile, the stress of the wind plane connected to the base plane prevents the FFC from protruding upwards under elasticity and moves following the signal collecting unit smoothly, and consequently, the anti-wear FFC keeps a proper distance to the glass. The friction between the glass and the anti-wear FFC has been eliminated. So that it prolongs the performance life of the anti-wear FFC and the glass.

These and other features, objects and advantages of the present invention will be more fully apparent from the following detailed description set forth below when taken in conjunction with the accompanying drawings.

DETAILED DESCRIPTION OF THE PREFERRED EMBODIMENT

Figure 1:
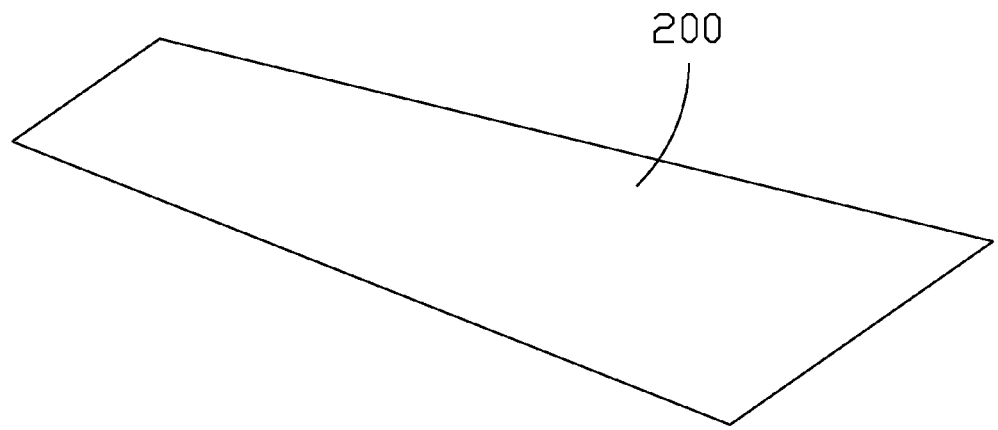
FIG. 1 is a perspective view of an unwrapped conventional FFC.
Figure 2:
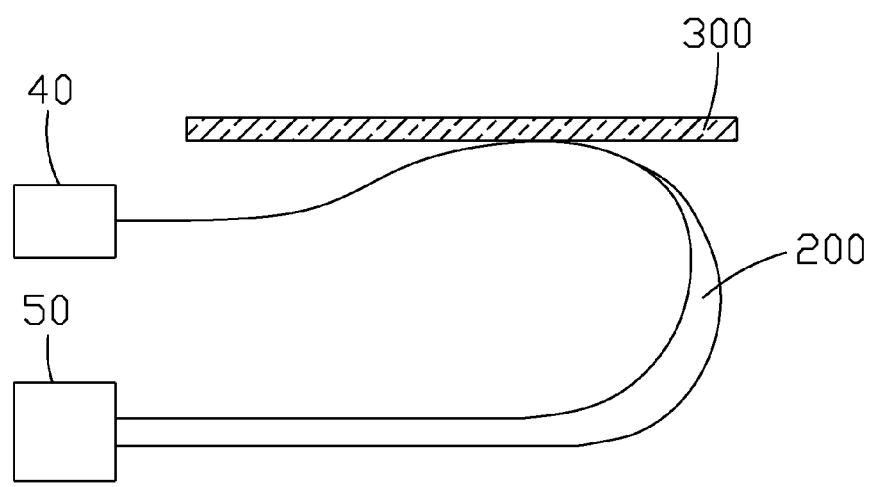
FIG. 2 is a schematic view illustrating the FFC at working state in prior art.
Figure 3:
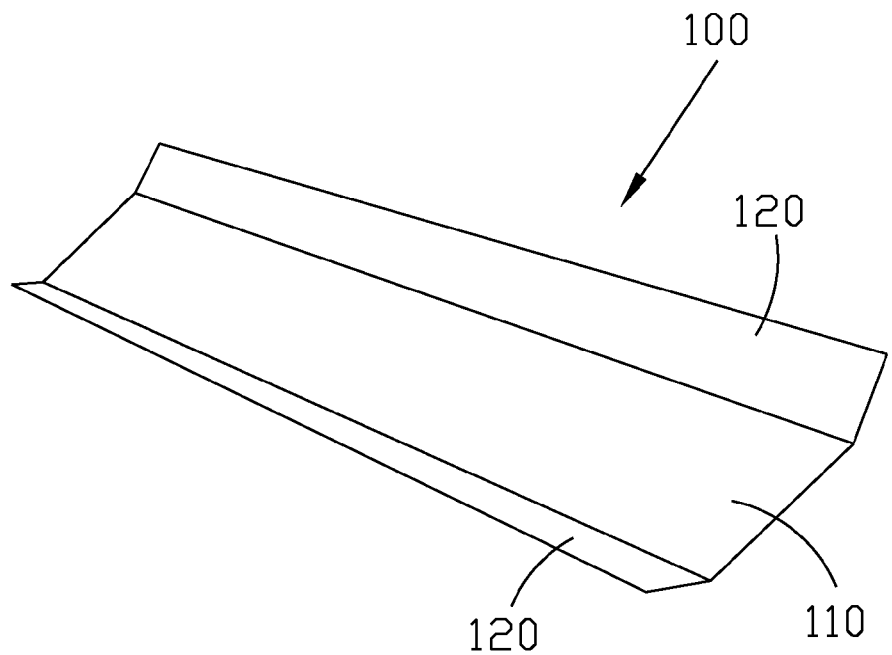
FIG. 3 is a perspective view of a FFC according to the present invention.

With reference to FIG. 3, a anti-wear FFC 100 according to the present invention is made up of a plurality of covered wires parallel to each other in side-by-side relationship. The anti-wear FFC 100 is folded and forms a plurality of planes lengthwise. The folded anti-wear FFC 100 includes a base plane 110 and a wing plane 120 connected to the base plane 110; the base plane 110 and the wing plane 120 forms an angle therebetween.

Figure 4:
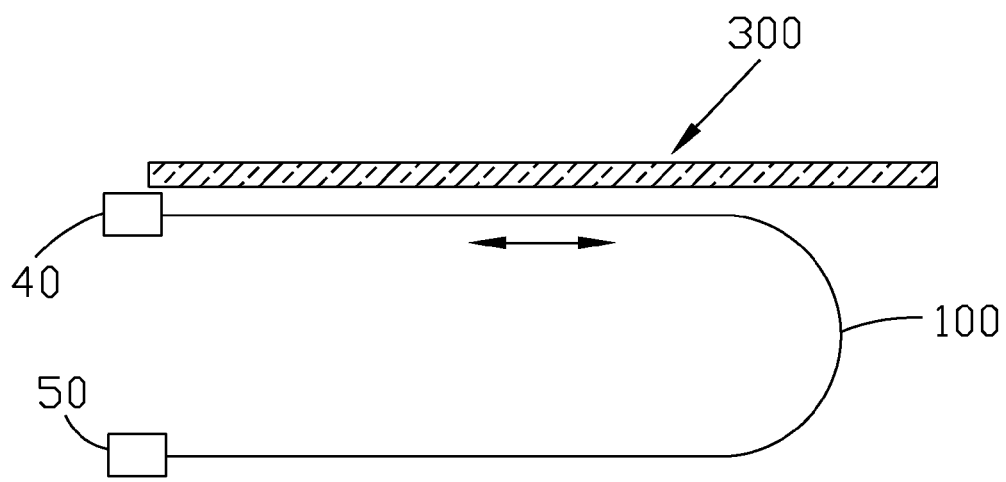
FIG. 4 is a schematic view illustrating the FFC at working state according to the present invention.
Figure 5:
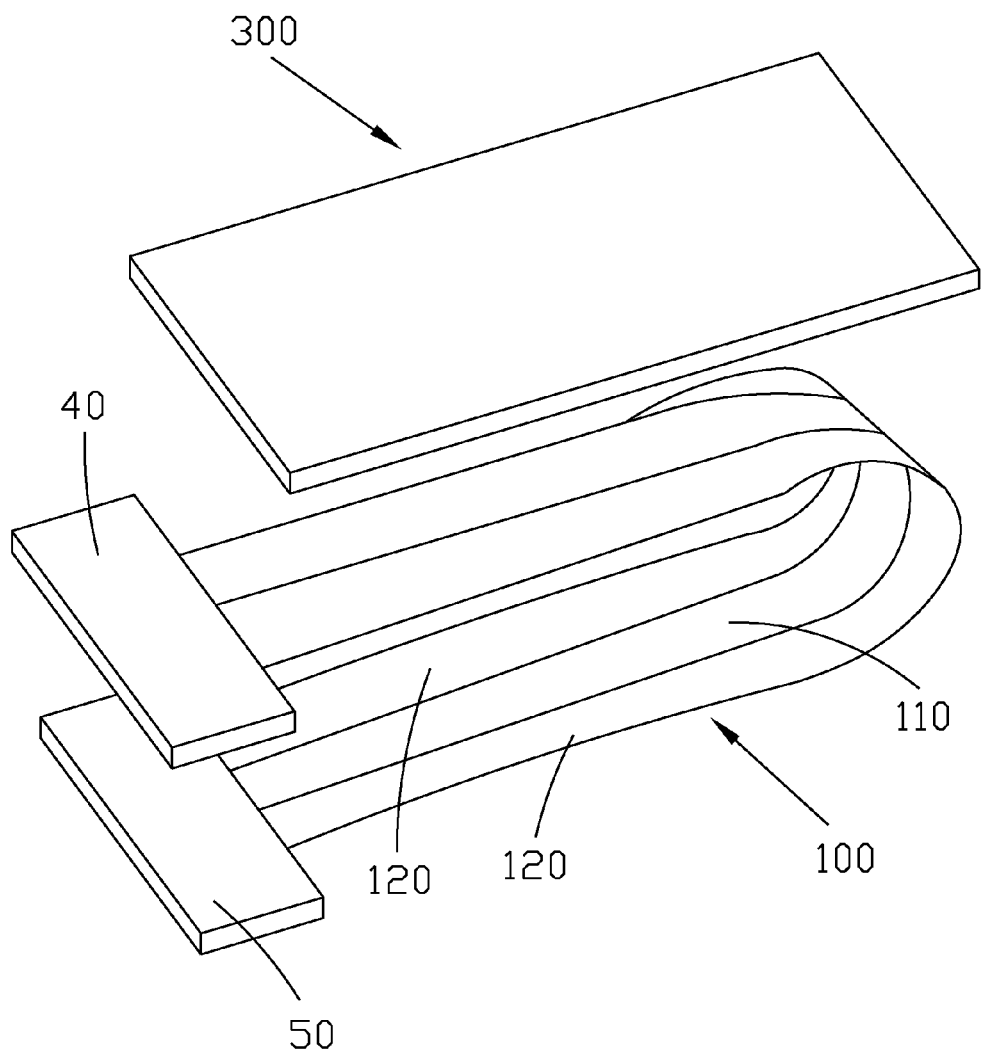
FIG. 5 is a perspective view of the FFC according to the present invention at working state.

Please refer to FIG. 4 and FIG. 5. The anti-wear FFC 100 is installed in an electronic device, such as a MFP or a scanner, and connects to a signal collecting unit 40 at one end and to a signal processing unit 50 at another end for transmitting electrical signal. The signal collecting unit 40 and signal processing unit 50 are covered by a glass 300. During operation, a user firstly puts a desired object on the glass 300. The signal collecting unit 40 moves under the glass 300 to scan the object and transmits electrical signal to the signal processing unit 50 for further processing via the anti-wear FFC 100.

The signal collecting unit 40 is positioned upon the signal processing unit 50 as mentioned above. Therefore, the anti-wear FFC 100 will be bent, especially, when the signal collecting unit 40 moves to a position right upon the signal processing unit 50, the anti-wear FFC 100 is bent and forms an "U" shape between the signal collecting unit 40 and the signal processing unit 50. The stress of the wing plane 120 connected to base plane 110 prevents the FFC 100 from protruding upwards under elasticity and moves following the signal collecting unit 40 smoothly, consequently, the anti-wear FFC 100 keeps a proper distance to the glass 300.

Alternatively, the covered wires mentioned above of the anti-wear FFC 100 may be positioned only in the base plane 110 of the anti-wear FFC.

The anti-wear FFC 100 according to the present invention moves smoothly and keeps a proper distance to the glass 300 when the signal collecting unit 40 moves back and forwards for collecting signal. Accordingly, the friction between the glass 300 and the anti-wear FFC 100 has been eliminated, further prolongs the performance life of the anti-wear FFC 100 and the glass 300.

Although a preferred embodiment of the present invention has been described in detail hereinabove, it should be clearly understood that many variations and/or modifications of the basic inventive concepts herein taught which may appear to those skilled in the present art will fall within the spirit and scope of the present invention, as defined in the appended claims.

What is claimed is:

1. An anti-wear flexible flat cable, having a plurality of covered wires parallel to each other in side-by-side relationship, said anti-wear flexible flat cable is folded to form a plurality of parallel planes in a lengthwise parallel direction, said anti-wear flexible flat cable comprising:
 a flat surface base plane having no contact with a glass in an electronic device;
 a first wing plane connected to a first longitudinal side of said flat surface base plane, a second wing plane connected to a second longitudinal side of said flat surface base plane, said flat surface base plane and said first and second wing planes forming two respective angles therebetween, and wherein said flat surface base plane and said first and second wing planes meet to form two respective lines positioned in lengthwise directions and are substantially parallel to a longitudinal axis of said anti-wear flexible flat cable.

2. The anti-wear flexible flat cable as claimed in claim 1, wherein said anti-wear flexible flat cable is installed in an electronic device and makes electrical connection between a signal collecting unit and a signal processing unit for transmitting electrical signal.

3. The anti-wear flexible flat cable as claimed in claim 2, wherein said signal collecting unit and said signal processing unit are covered by a glass.

4. An anti-wear flexible flat cable folded and formed a plurality of planes positioned in a lengthwise parallel configuration, said anti-wear flexible flat cable comprising a flat surface base plane having a distance between said anti-wear flexible flat cable and a glass in an electronic device which is made up of a plurality of covered wires parallel to each other in side-by-side relationship, a first and a second wing planes connected to a first and a second longitudinal sides of said flat surface base plane respectively, said flat surface base plane and said first and second wing planes forming two respective angles therebetween, and wherein said flat surface base plane and said first and second wing planes meet to form two respective lines positioned in lengthwise directions and said lines are substantially parallel to a longitudinal axis of said anti-wear flexible flat cable.

* * * * *